United States Patent
Herzig et al.

(10) Patent No.: US 10,147,042 B2
(45) Date of Patent: Dec. 4, 2018

(54) SYNCHRONIZATION FOR CONTEXT-AWARE COMPLEX EVENT PROCESSING

(71) Applicant: SAP SE, Walldorf (DE)

(72) Inventors: Philipp Herzig, Dresden (DE); Michael Ameling, Dresden (DE)

(73) Assignee: SAP SE, Walldorf (DE)

( * ) Notice: Subject to any disclaimer, the term of this patent is extended or adjusted under 35 U.S.C. 154(b) by 531 days.

(21) Appl. No.: 14/875,496

(22) Filed: Oct. 5, 2015

(65) Prior Publication Data
US 2016/0026921 A1   Jan. 28, 2016

Related U.S. Application Data

(63) Continuation of application No. 13/649,916, filed on Oct. 11, 2012, now Pat. No. 9,171,252.

(51) Int. Cl.
*G06N 5/04* (2006.01)
*G06N 5/02* (2006.01)
*G06N 99/00* (2010.01)

(52) U.S. Cl.
CPC .............. *G06N 5/046* (2013.01); *G06N 5/02* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 7,457,728 B2 * | 11/2008 | Chen | G06F 9/542 |
| | | | 702/189 |
| 8,645,296 B2 * | 2/2014 | Proctor | G06N 5/022 |
| | | | 706/45 |
| 9,171,252 B2 | 10/2015 | Herzig et al. | |
| 2002/0147611 A1 | 10/2002 | Greene | |
| 2009/0138342 A1 | 5/2009 | Otto et al. | |
| 2012/0270661 A1 | 10/2012 | Smith et al. | |
| 2012/0331036 A1 | 12/2012 | Duan et al. | |
| 2013/0232030 A1 | 9/2013 | Gockeler et al. | |

(Continued)

OTHER PUBLICATIONS

Chen, Harry Lik; "An Intelligent Broker Architecture for Pervasive Context-Aware Systems"; 2004; University of Maryland; PhD Dissertation; 129 pages. (Year: 2004).*

(Continued)

*Primary Examiner* — Stanley K. Hill
(74) *Attorney, Agent, or Firm* — Fountainhead Law Group P.C.

(57) ABSTRACT

A complex event processing system comprises one or more rule engines configured to receive information from a source system via a message broker. Multiple rule engines may be used in parallel, with the same/different rules deployed. According to an embodiment, a rule engine may include a manager component, a proxy component, a reasoner component, and a working memory. The manager and proxy serve as interfaces with the message broker to allow asynchronous communication with a provider storing state information. The reasoner is configured to execute rules based upon occurrence of events in the source system. Embodiments may be particularly suited to implementing a gamification platform including a business entity provider, with an existing business source system (e.g. CRM, ERP).

14 Claims, 10 Drawing Sheets

(56) References Cited

U.S. PATENT DOCUMENTS

| | | |
|---|---|---|
| 2013/0262188 A1 | 10/2013 | Leibner et al. |
| 2013/0282421 A1 | 10/2013 | Graff et al. |
| 2013/0291065 A1 | 10/2013 | Jakowski et al. |
| 2013/0316311 A1 | 11/2013 | England |
| 2013/0324201 A1 | 12/2013 | Eberlein et al. |
| 2013/0337909 A1 | 12/2013 | Pattison et al. |
| 2014/0051506 A1 | 2/2014 | Ameling et al. |
| 2014/0108318 A1 | 4/2014 | Herzig et al. |
| 2014/0322676 A1 | 10/2014 | Raman |
| 2015/0141149 A1 | 5/2015 | Thomas et al. |
| 2015/0328550 A1 | 11/2015 | Herzig et al. |

OTHER PUBLICATIONS

Baldauf, Mathias et al.; A survey on context-aware systems; Int. J. Ad Hoc and Ubiquitous Computing, vol. 2, No. 4, 2007; pp. 263-277. (Year: 2007).*

Wang, Di et al.; Active Complex Event Processing over Event Streams; 2011; Proceedings of the VLDB Endowment, vol. 4, No. 10; pp. 634-645. (Year: 2011).*

Voisard, Agnes et al.; Architect: A layered framework for classifying technologies of event-based systems; Elsevier; Information Systems 36 (2011) 937-957. (Year: 2011).*

Fahy, Patrick et al.; CASS—Middleware for Mobile Context-Aware Applications; Distributed Systems Group, Computer Science Department, Trinity College Dublin, Ireland; 2004; 6 pages. (Year: 2004).*

J. Boubeta-Puig, G. Ortiz, and I. Medina-Bulo, "An Approach of Early Disease Detection using CEP and SOA." In Third International Conferences on Advanced Service Computing, pp. 143-148, Jan. 2011.

S. Deterding, M. Sicart, L. Nacke, K. O'Hara, and D. Dixon, CHI. Gamification: Using Game Design Elements in Non-Gaming Contexts, Vancouver, BC, Canada, May 2011. ACM Press.

D. Flatla, C. Gutwin, L. Nacke, S. Bateman, and R. Mandryk, "Calibration Games: Making Calibration Tasks Enjoyable by Adding Motivating Game Elements." In UIST, Oct. 2011.

M. Geall, "Enterprise IT—Workers of the World Consume and Unite." Global Markets Research, pp. 1-84, Sep. 2011.

P. Herzig S. Strahringer, and M. Ameling, "Gamification of ERP Systems—Exploring Gamification Effects on User Acceptance Constructs." In Multikonferenz Wirtschaftsinformatik, pp. 793-804. GITO, Jan. 2012.

J. Hohwiller, D. Schlegel, G. Grieser, and Y. Hoekstra, "Integration of BPM and BRM." In R. Dijkam, J. Hofstetter, and J. Koehler, editors, Business Process Modeling and Notation, pp. 136-141, Berlin, Heidelberg, Jan. 2011. Springer.

M. E. Kharbili and T. Keil, "Bringing Agility to Business Process Management: Rules Deployment in an SOA." In Emerging Web Services Technology—vol. III, pp. 157-170, Basel, Boston, Berlin, 2009. Birkhauser Verlag.

C. Petty and H. Stevens, "Over 70 Percent of Global 2000 Organisations Will Have at Least One Gamified Application by 2014." retrieved from Internet: http://www.gartner.com/it/page.jsp?id+ 1844115. Nov. 2011.

J. Thom, D. R. Millen, and J. DiMicco, "Removing Gamification from an Enterprise SNS." In Proceedings CSCW, Feb. 2012.

Y. Xu, "Literature Review on Web Application Gamification and Analytics," CSDL Technical Report 11-05. Apr. 2012.

J. Yang, M. S. Ackerman, and L. A. Adamic, "Virtual Gifts and Guanxi: Supporting Social Exchange in a Chinese Online Community." In Proceedings CSCW, 2011, Mar. 2011. China.

D. Sottara, P. Mello, and M. Proctor, "A Configurable Rete-OO Engine for Reasoning with Different Types of Imperfect Information," IEEE Computer Society, IEEE Transactions on Knowledge and Data Engineering, vol. 22, No. 11, Nov. 2010.

D. Anicic, P. Fodor, S. Rudolph, R. Stuehmer, N. Stojanovic, and Rudi Studer, "A Rule-Based Language for Complex Event Processing and Reasoning," P. Hitzler and T. Lukasiewicz (Eds.) RR 2010, LNCS 6333, pp. 42-57, Springer-Verlag Berlin Heidelberg 2010.

D. Anicic, S. Rudolph, P. Fodor, N. Stojanovic, "Retractabale Complex Event Processing and Steam Reasoning," N. Bassiliades et al. (Eds.): Rule ML 2011, Europe, LNCS 6826, pp. 122-137, Springer-Verlag Berlin Heidelberg, Jan. 2011.

E. H. Calvillo-Gamez, P. Cairns, and A. L. Cox, "Assessing the Core Elements of the Gaming Experience," Chapter 4, R. Bernhaupt (ed.) Evaluating User Experience in Games, Human-Computer Interaction Series, Springer-Verlag London Limited 2010.

H. Obweger, J. Schiefer, M. Suntinger, and R. Thullner, "Entity-Based State Management for Complex Event Processing Applicaitons," N. Bassiliades et al. (Eds.): Rule ML 2011, Europe, LNCS 6826, pp. 154-169, Springer-Verlag Berlin Heidelberg, Jan. 2011.

R. H. Thomas, "A Majority Consensus Approach to Concurrency Control for Multiple Copy Databases," ACM Trans. Database Syst., vol. 4, No. 2, pp. 180-209, Jun. 1979. [Online]. Available:http://doi.acm.org/10.1145/320071.320076.

P. Herzig, M. Ameling and A. Schill, "A Generic Platform for Enterprise Gamification," in 10th Working IEEE/IFIP Conference on Software Architecture & 6th European Conference on Software Architecture, 2012.

A. Alves, "Extensions to Logic Programming Inference Engines to Support CEP," in RuleML '09, 2009.

Bunchball Inc., Available on http://www.bunchball.com/ (retrieved on May 9, 2012) and printed on Oct. 11, 2012.

Bigdoor Media, 2012. Available on http://www.bigdoor.com/how-it-works/ (retrieved on May 5, 2012) and printed on Oct. 11, 2012.

PunchTab. Available on http://www.punchtab.com (retrieved on May 9, 2012) and printed on Oct. 11, 2012.

Gigya, 2012. Available on http://www.gigya.com/gamification (retrieved on May 29, 2012) and printed on Oct. 11, 2012.

Actionable, 2012. Available on http://iactionable.com/ (retrieved on May 29, 2012) and printed on Oct. 11, 2012.

Open Badges. Available on http://openbadges.org/en-US/ (retrieved on May 29, 2012) and printed on Oct. 11, 2012.

Userinfuser. Available on http://code.google.com/p/userinfuser/ (retrieved on May 29, 2012) and printed on Oct. 11, 2012.

Badgeville, The Behavior Frameworks. Available on http://www.badgeville.com/how-we-help/behavior-frameworks/, printed on Oct. 11, 2012.

Matthias Strobbe, Olivier Van Laere, Femke Ongenae, Samuel Dauwe, Bart Dhoedt, Filip DeTurck, and Piet Demeester, and Kris Luyten, "Novel Applications Integrate Locations and Context Information," in Context-Aware Computing, IEEE CS, 1536-1268, 2012.

Dr. Alexander Schill, "Context-aware Applications and Location Based Services," Mobile Communication and Mobile Computing, Technische Universitat Dresden, Department of Computer Science. Nov. 2012.

Badgeville. Website, Mar. 2014. http://www.badgeville.com.

Bunchball. Website, Mar. 2014. http://www.bunchball.com.

J. Dormans. Engineering emergence: applied theory for game design. CC, 2012.

P. Herzig, M. Ameling, B. Wolf, and A. Schill. "Implementing Gamification: Requirementsand Gamification Platforms". In Torsten Reiners and Lincoln Wood, editors, Gamificationin Education and Business. Springer, 2014.

J. Hamari, J. J Koivisto, and H. Sarsa. "Does Gamification Work. In a Literature Review of Empirical Studies on gamification". In proceedings of the 47th Hawaii InternationalConference on System Sciences, Hawaii, USA, 2014.

G. Rimon. Website, Apr. 2014. http://www.gamification.co/2013/07/17/ how-to-measure-the-roi-of-gamification/.

U.S. Appl. No. 14/276,679 (not yet published), filed May 13, 2014, entitled "Context-aware Gamification Platform." Inventors: Philipp Herzig and Michael Ameling.

U.S. Appl. No. 14/491,826 (not yet published), filed Sep. 19, 2014, entitled "Providing Gamification Analytics in an Enterprise Environment" Inventors: Philipp Herzig and Benjamin Heilbrunn.

* cited by examiner

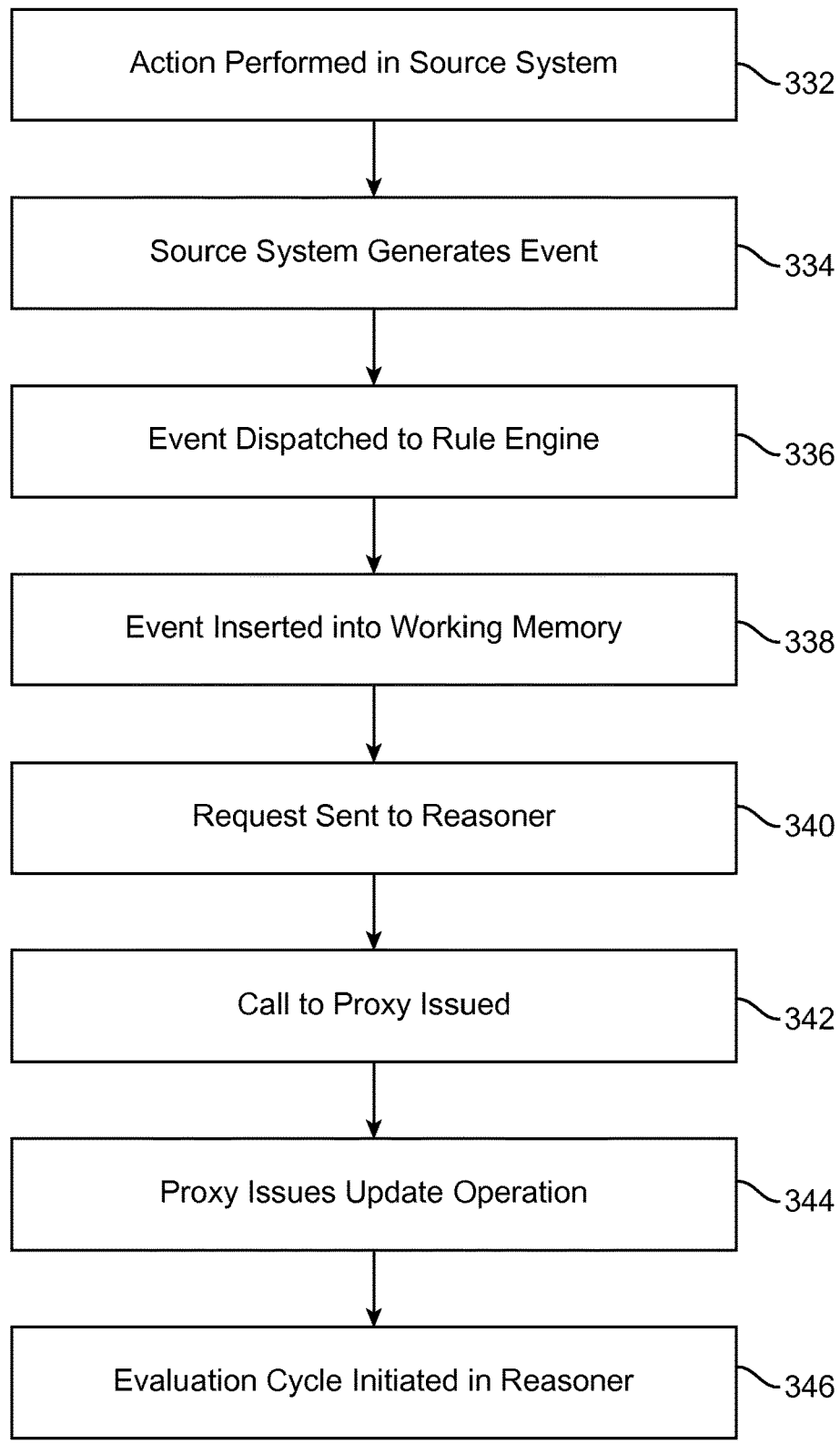
FIG. 3A1

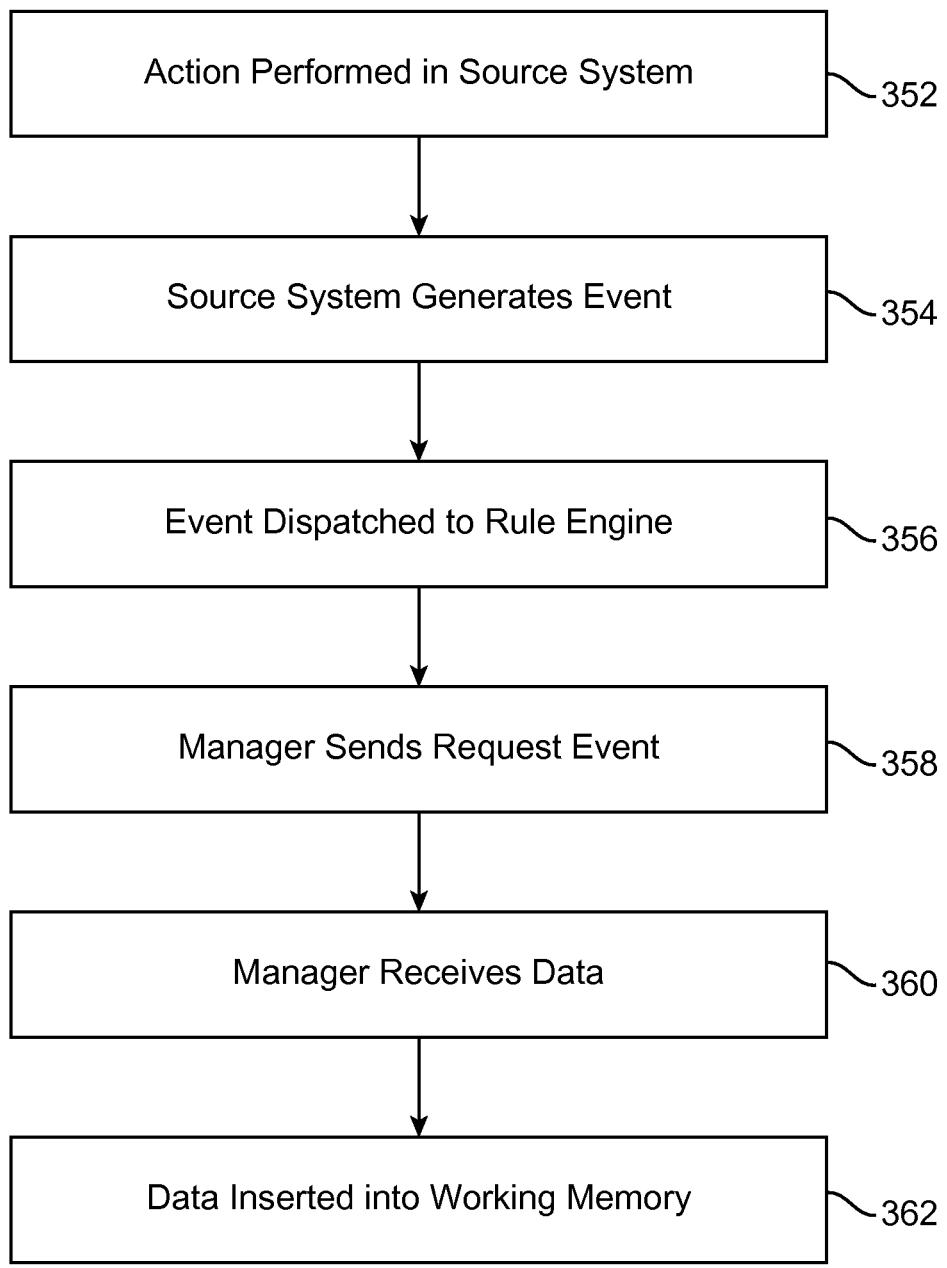
FIG. 3B1

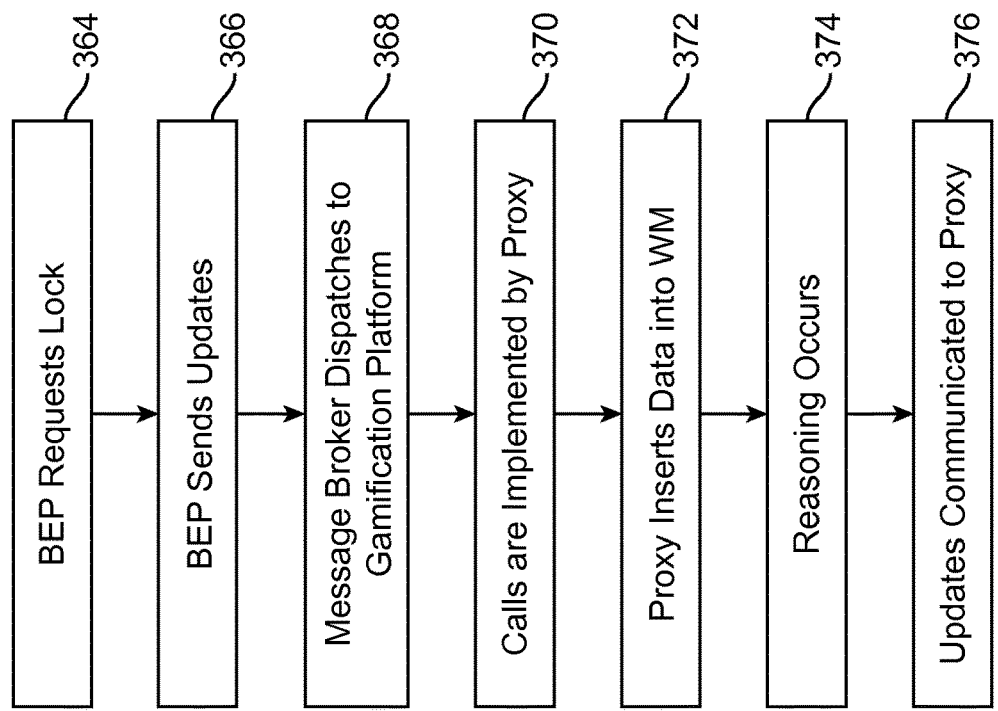
FIG. 3C1b
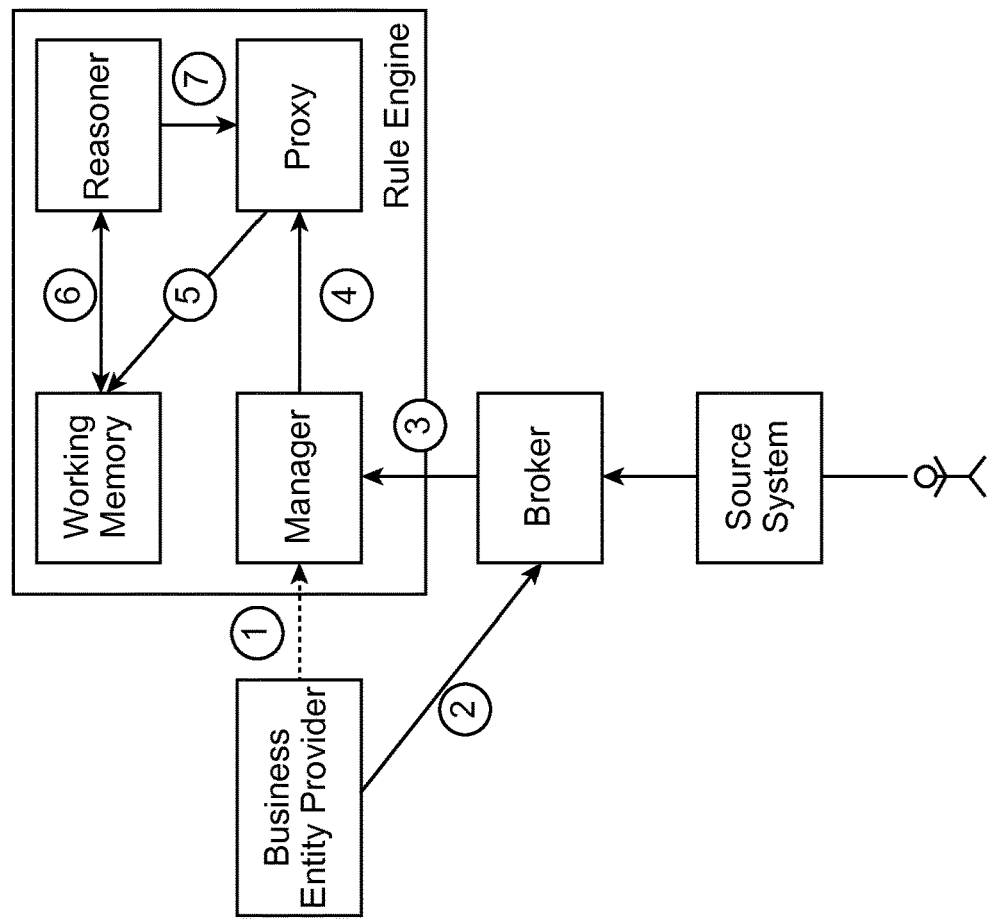
FIG. 3C1a

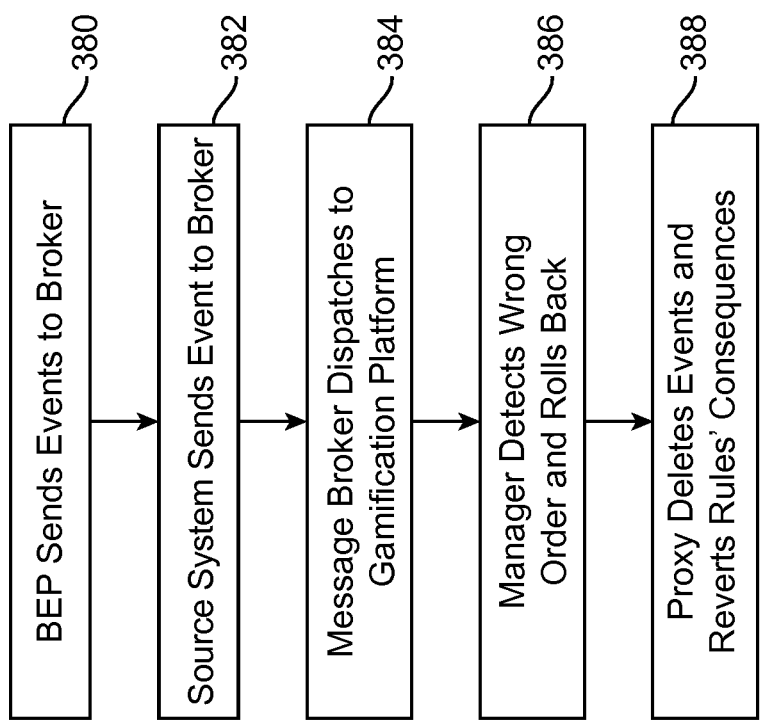
FIG. 3C2b
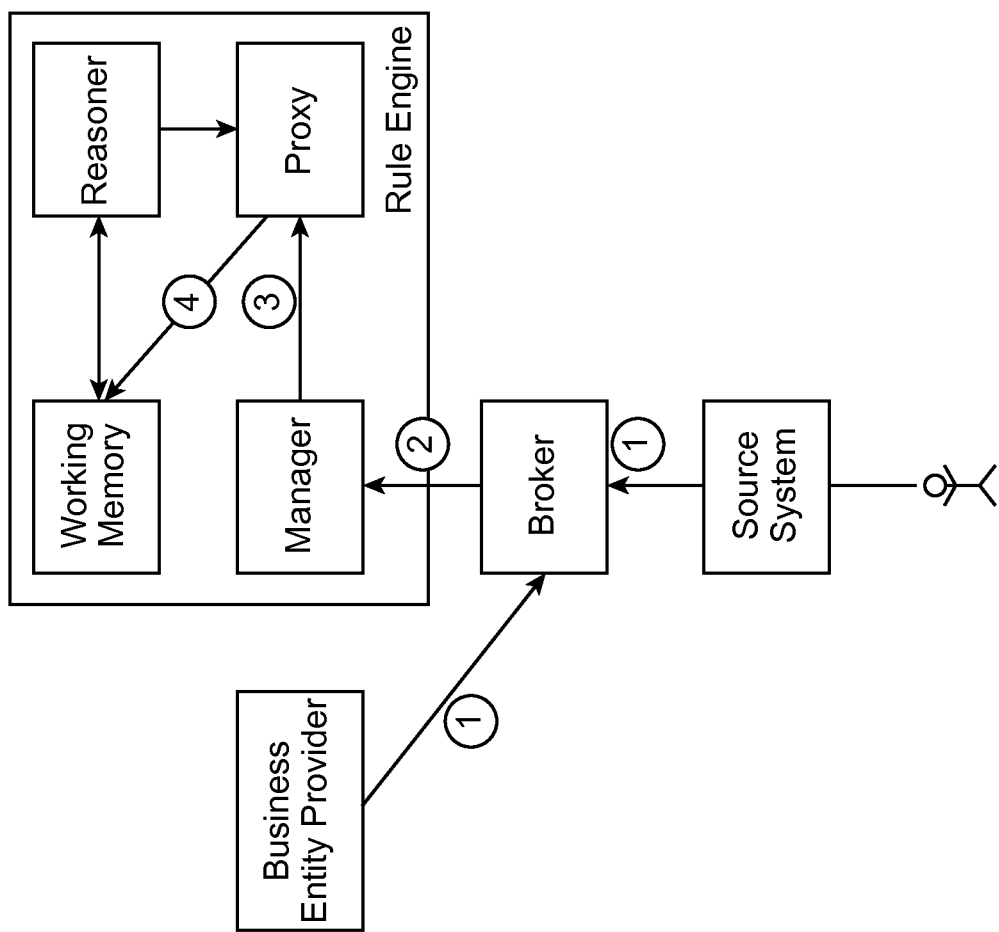
FIG. 3C2a

SYNCHRONIZATION FOR CONTEXT-AWARE COMPLEX EVENT PROCESSING

CROSS-REFERENCE TO RELATED APPLICATION

The instant nonprovisional application is a continuation of U.S. Nonprovisional patent application Ser. No. 13/649,916 filed Oct. 11, 2012 and incorporated by reference in its entirety herein for all purposes.

BACKGROUND

Embodiments of the present invention relate to complex event processing (CEP), and in particular, to synchronization for context-aware complex event processing.

Unless otherwise indicated herein, the approaches described in this section are not prior art to the claims in this application and are not admitted to be prior art by inclusion in this section.

A context-aware platform may be suitable for usage within enterprise IT landscapes. One example of such a context-aware platform is a gamification platform employing gamification rules defined by a business user prior or during to the system's runtime. The rules may comprise a condition (if-part) and a consequence (then-part), with the consequences fired once a rule's condition becomes true.

However, not all rules reason over only event data generated by a typical source system. Some rules may also utilize contextual gamification data. Such contextual gamification data can comprise for example, properties of the user or user actions from the past. For example, a rule may only apply if the user has badge X, has Y experience points, or has collected Z currency. These are typical user properties that may be relevant to game rules.

Such an environment may thus call for context-awareness and synchronization over a number of complex events. While conventional CEP approaches place a premium on high throughput, they tend to be less concerned with data consistency and correctness issues. Moreover, due to the distribution of data (replicated/redundant data), a synchronization approach is useful for CEP.

Accordingly, the present disclosure addresses these and other issues with systems and methods allowing synchronization for context-aware complex event processing.

SUMMARY

A complex event processing system comprises one or more rule engines configured to receive information from a source system via a message broker. Multiple rule engines may be used in parallel, with the same/different rules deployed. According to an embodiment, a rule engine may include a manager component, a proxy component, a reasoner component, and a working memory. The manager and proxy serve as interfaces with the message broker to allow asynchronous communication with a provider storing state information. The reasoner is configured to execute rules based upon occurrence of events in the source system. Embodiments may be particularly suited to implementing a gamification platform with an existing business source system (e.g. CRM, ERP).

An embodiment of a computer-implemented method comprises causing a manager component of a first rule engine to receive from a message broker, a first event dispatched from a first source system. The first rule engine is caused to insert the event into a working memory component of the first rule engine. The manager component is caused to send a request to a reasoner component of the first rule engine. The reasoner is caused to issue a call to a proxy component of the first rule engine. The proxy component is caused to issue an update operation to a first provider storing context information, and the working memory component is updated.

An embodiment of a non-transitory computer readable storage medium embodies a computer program for performing a method comprising causing a manager component of a first rule engine to receive from a message broker, a first event dispatched from a first source system. The first rule engine is caused to insert the event into a working memory component of the first rule engine. The manager component is caused to send a request to a reasoner component of the first rule engine. The reasoner is caused to issue a call to a proxy component of the first rule engine. The proxy component is caused to issue an update operation to a first provider storing context information, and the working memory component is updated.

An embodiment of a computer system comprises one or more processors and a software program executable on said computer system. The software program is configured to cause a manager component of a first rule engine to receive from a message broker, a first event dispatched from a first source system. The software program is further configured to cause the first rule engine to insert the event into a working memory component of the first rule engine, and to cause the manager component to send a request to a reasoner component of the first rule engine. The software program is configured to cause the reasoner to issue a call to a proxy component of the first rule engine. The software program is further configured to cause the proxy component to issue an update operation to a first provider storing context information, and to cause the working memory component to be updated.

Some embodiments further comprise causing the manager component of the first rule engine to receive from a second source system, a second event dispatched from a message broker, causing the rule engine to insert the event into a working memory component of the rule engine, and causing the manager component to send a request to a reasoner component of the rule engine. The reasoner is caused to issue a call to a proxy component of the rule engine, and the proxy component is caused to issue an update operation to a second provider storing second context information.

According to certain embodiments the source system comprises a business system, and the provider comprises a business entity provider.

In various embodiments the provider and rule engine together comprise a context-aware platform.

In particular embodiments the context-aware platform comprises a gamification platform.

According to certain embodiments, during initialization the manager component is caused to send a request event to the provider via the message broker, the manager component is caused to receive data sent by the provider in response to the request event, and the manager is caused to store the data in the working memory.

Some embodiments further comprise comprising causing the proxy component to resolve a conflict arising between the event and a changed content of the provider.

The following detailed description and accompanying drawings provide a better understanding of the nature and advantages of particular embodiments.

BRIEF DESCRIPTION OF THE DRAWINGS

FIG. 3A1 is a simplified process flow of FIG. 3A.

FIG. 3B1 is a simplified process flow of FIG. 3B.

FIGS. 3C1a shows an embodiment of a complex event processing system with input to the Business Entity Provider.

FIG. 3C1b is a corresponding simplified process flow.

FIGS. 3C2a shows an embodiment of a complex event processing system with input to the Business Entity Provider.

FIG. 3C2b is a corresponding simplified process flow.

DETAILED DESCRIPTION

Described herein are techniques for complex event processing and combined architectures. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

The following description focuses upon a context aware complex event processing system in a gamification environment, having high consistency requirements in near real time. However, embodiments are not limited to use in connection with gamification, and may be applicable to context-aware event processing in a variety of domains calling for data storage fully or partially in a loosely-coupled system. Other examples of domains of context aware complex event processing having high consistency requirements, include but are not limited to finance and banking software systems.

Figure 1:
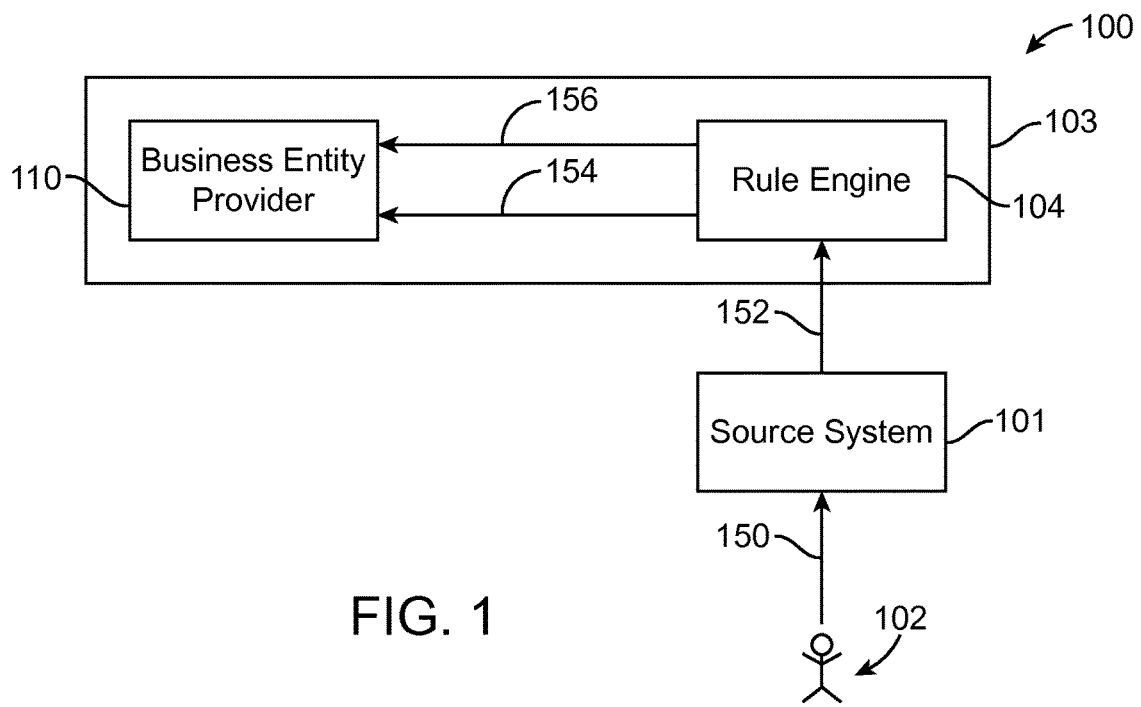
FIG. 1 shows a synchronous complex event processing system.

FIG. 1 shows an embodiment of a synchronous complex event handing system 100 comprising a source system 101 that generates events based upon actions 150 by a user 102. These events 152 are sent synchronously to the context-aware complex event processing system, here a gamification platform 103.

The source system may be a business system or other application. Examples of business systems include but are not limited, to Enterprise Resource Planning (ERP) systems, Customer Relations Management (CRM) systems, and Supply Chain Management (SCM) systems, logistics systems, and production planning systems.

While the particular example of FIG. 1 shows a single source system, various embodiments can have multiple source systems. These source systems can be a variety of source systems from one enterprise. These source systems can also be event multiple or same applications from multiple businesses, consolidated in the "cloud" by the platform itself.

According to certain embodiments, the source system can even be the gamification platform itself. One example of such a context-aware complex event processing environment is where multiple businesses have their own instances of the platform with individual rules, and a parent platform captures interactions between the businesses under common gamification rules.

In the particular embodiment of FIG. 1, the gamification platform 103 comprises a rule engine 104 and a Business Entity Provider (BEP) 110. The BEP comprises a repository of the state of users in the context aware complex event processing environment (here gamification). The connected rule engine includes rules, for example the game rules that are defined by a business user prior to the system's runtime.

Again, while FIG. 1 shows only a single rule engine and BEP, other embodiments are possible. For example, a system may comprise multiple rule engines to serve multiple tenants (i.e., customers, businesses, groups, teams, and the like). A system may comprise multiple BEPs (source systems, game repositories). Hence, in various embodiments there may exist many-to-many relationships between a plurality of engines and BEPs.

The rules of the rule engine comprise a condition (if-part), and a consequence (then-part). The consequences are executed once a rule's condition becomes true.

As mentioned above, however, not all rules only reason over event data generated by the source system. Some rules may reason based upon additional information, for example contextual gamification data comprising properties of the user or user actions from the past.

Hence, in the system of FIG. 1, the rule engine may query 154 the user's prior achievements upon the arrival of each event from the BEP 110. Ultimately, the rule engine may fire a consequence based on the event and context data, which leads to an update operation 156 of the business entity provider.

Such an update operation may be performed at a low level, and the BEP may calculate a higher state based on the update. For example, the user may get one experience point for an action lasting for at least 24 hr in the system, or five experience points for a different type of action.

Under this scheme, the BEP calculates the overall score (sum over all single point events). Hence, upon the arrival of each event from the source system, the context is loaded again by querying the BEP.

The score calculation just described, represents only one example of the capability of the BEP. The BEP may also perform one or more functions such as:

calculating/Deriving arbitrarily complex states (avg, median, count, sum, partial derivatives, max, min, . . . );

calculation/deriving temporal constraints;

rejecting updates if there are wrong semantically; and performing composite calculations, simple or complex, user defined, etc.

While consistency is ensured by this approach, rule execution and update operations may be delayed. This is due to the synchronous calls taking place between the rule engine and the BEP. This is especially true when the sampling period T of the source system is low (i.e., there are many events to be processed concurrently and/or the BEP is working on full capacity).

The resulting delay can be unsatisfying to a user and/or may be not acceptable for the system behavior. It can also conflict with near real-time performance requirements for certain collaborative scenarios.

Again, while consistency is ensured by the approach of FIG. 1, it may also result in the generation of unnecessary synchronization calls, consuming processor resources and memory or increasing data traffic. Assuming that a synchronization step is done for each new event, as a consequence thereof a rule executes with probability p only, there are (1-p) unnecessary synchronization calls.

It is further noted that in the synchronous case of FIG. 1, the potentially multiple BEPs are to be known in advance. Thus endpoints are to be configured accordingly prior to the system's runtime.

Figure 2:
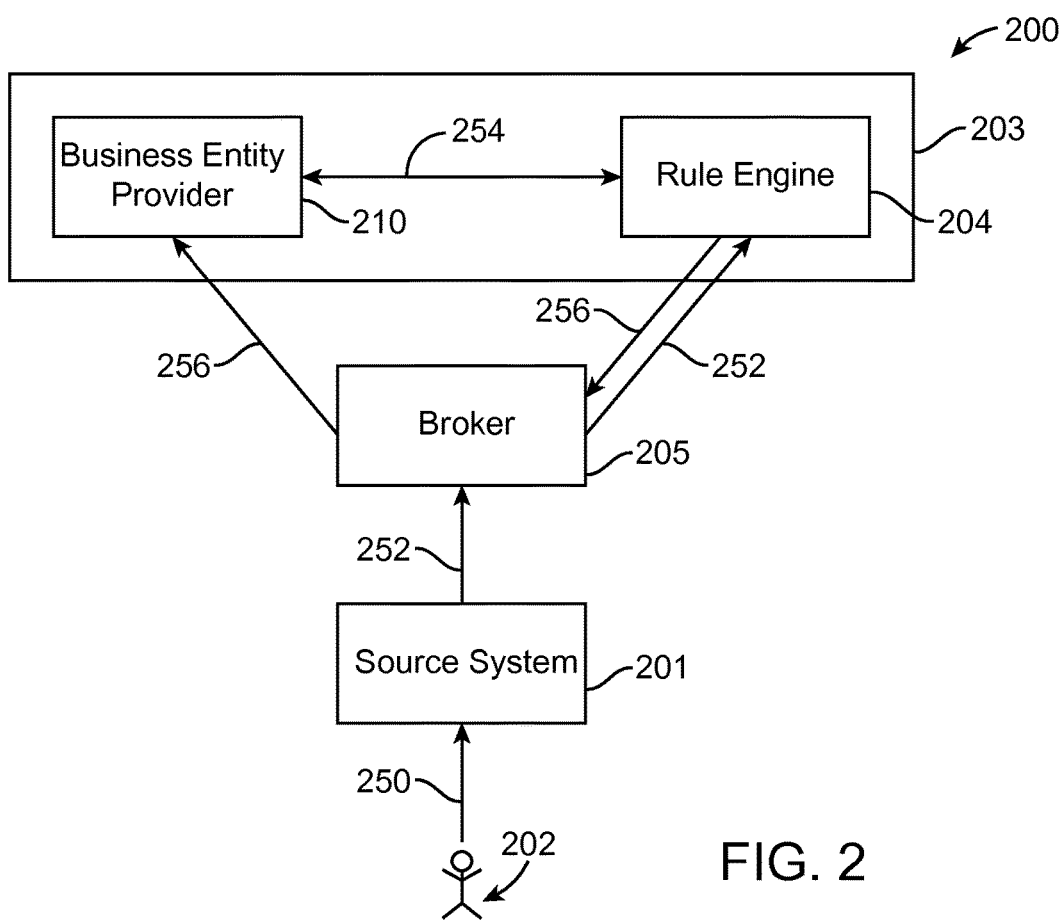
FIG. 2 shows an asynchronous complex event processing system.

An alternative approach is an asynchronous architecture design incorporating a message broker. FIG. 2 shows such an alternative embodiment of a system 200 that is similar to that depicted in FIG. 1, but which also includes a message broker 205.

In particular, message broker serves as an intermediary between the source system 201 and the gamification platform 203. The message broker communicates the events 252 to the gamification platform, and also communicates update operations 256 between the rule engine 204 and the BEP 210.

While introduction of the message broker does address timing delays, the asynchronous architecture of FIG. 2 may experience issues with synchronization. For example a user may have previously accumulated forty-nine points (stored in the BEP), and then issues an event giving an additional point leading to fifty total points.

In the asynchronous approach of FIG. 2 utilizing a message broker this event could be detected by another rule. The user may receive award of a "gold status" based on the fifty points accumulated as a consequence of the rule.

If, however, the user receives one more point by a concurrently executed second action, the user experience would remain forty-nine points. The user might thus wrongly receive the same badge twice, or the rule might not even be fired owing to concurrency between the BEP and rule engine cache. Thus, consistency is not ensured and occurs randomly in a real system.

Figure 3:
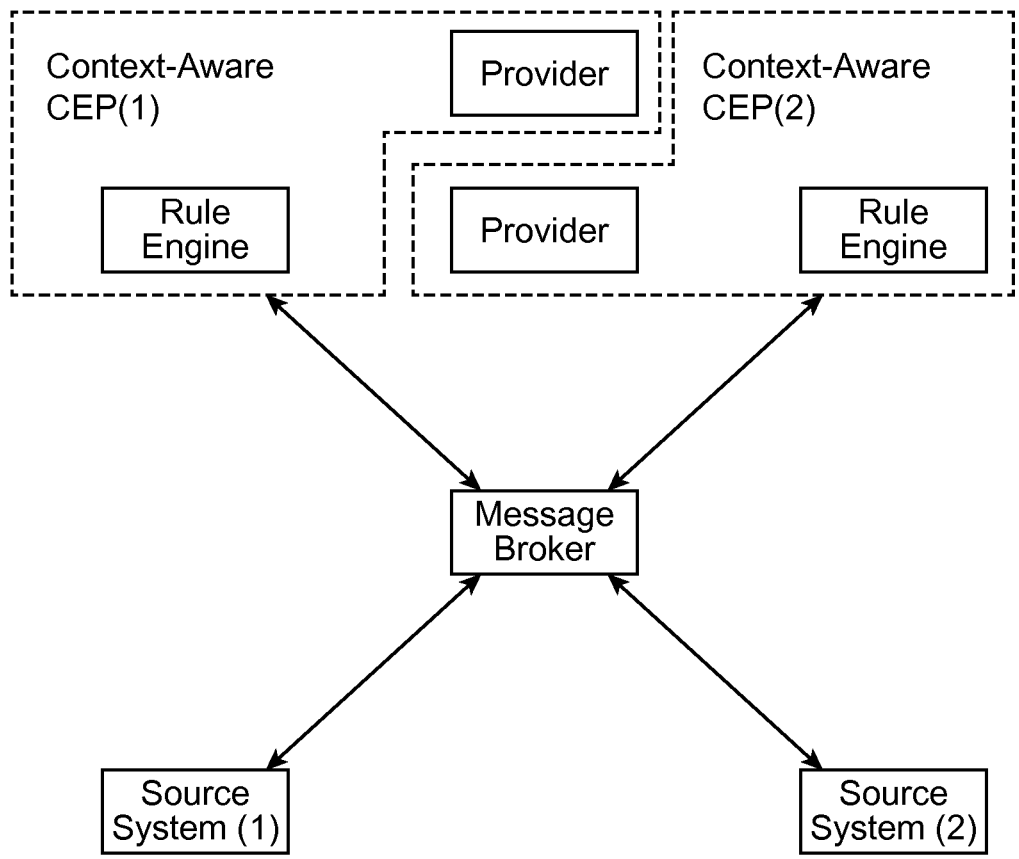
FIG. 3 shows a simplified view of a plurality of content-aware complex event processing systems in communication with source systems through a message broker.

Accordingly, FIGS. 3-3C2b show embodiments of a complex event processing system that is configured to address one or more of these issues. In particular, FIG. 3 shows a plurality of source systems that are configured to communicate with a plurality of context-aware CEP systems, through a message broker. Each context-aware CEP system comprises a rule engine component.

In FIG. 3, plurality of providers might be connected over the message broker. At least one context-aware CEP is logically connected with at least one provider (e.g., for a single tenant in a multi-tenant environment).

In certain application, a plurality of source systems may communicate with the same context-aware CEP system through the message broker. One example of such an application is where multiple entities/source systems (e.g. businesses), utilize rules offered by a same gamification platform, with context relevant to those different businesses being stored in an appropriate provider.

In some applications, a single source system may communicate with multiple context-aware CEP systems through the message broker. One example of such an application is where one entity/source system (e.g. business), is integrated with multiple gamification platforms having different rules, with context for each gamification platform being stored in respective providers.

Figure 3A:
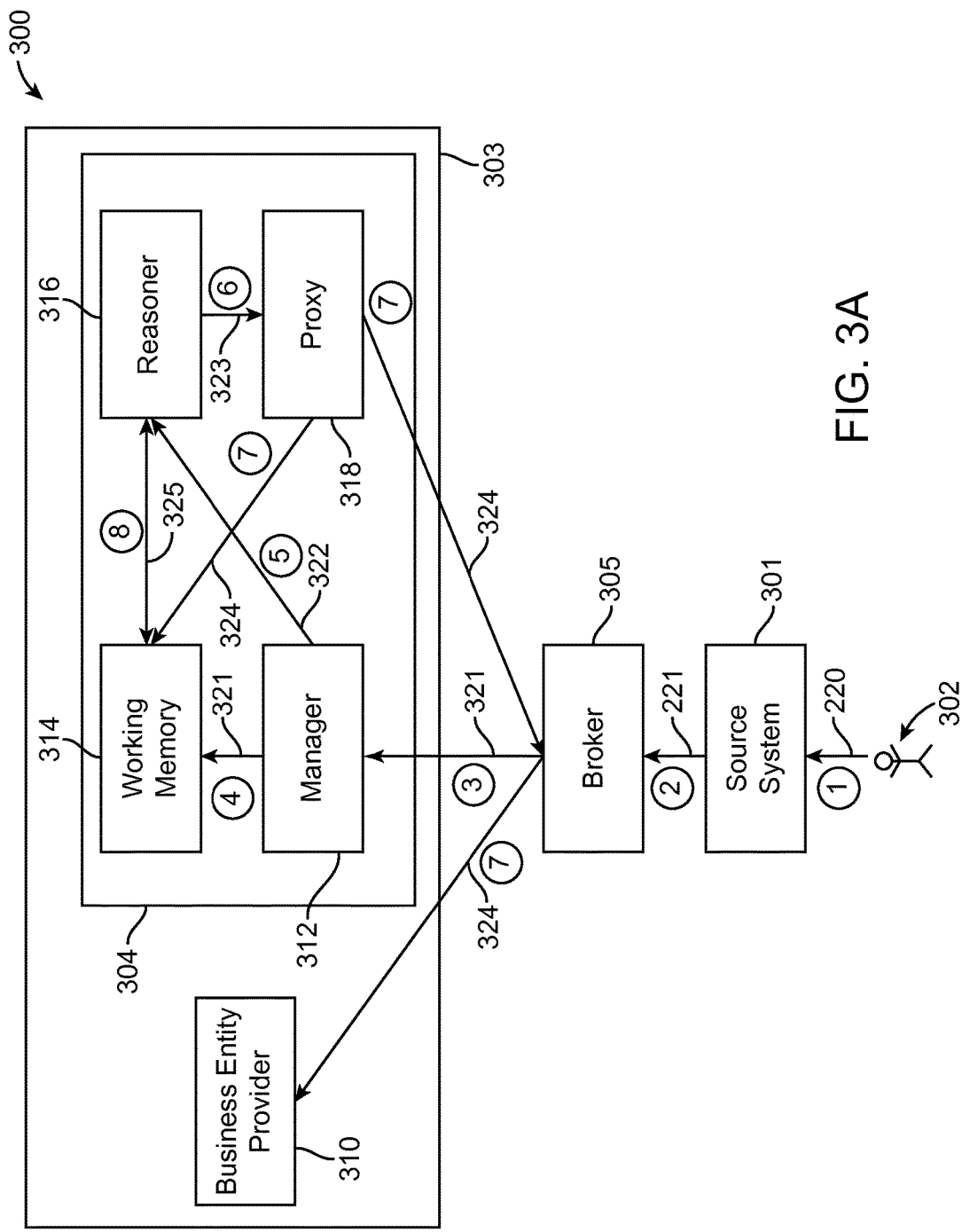
FIG. 3A shows an embodiment of a complex event processing system during runtime.

FIG. 3A shows one context aware complex event processing system during runtime. The complex event processing system 300 comprises a context aware CEP system 303 (here a gamification platform) comprising a BEP 310 and a rule engine 304. The system 300 further comprises the source system 301 and a message broker 305.

The rule engine 304 that includes a number of components introduced in several steps during initialization and runtime. The components comprise the manager 312, a working memory (WM) 314, a rule reasoner or inference engine 316, and a proxy 318.

In addition to the rule engine, the system 300 comprises the message broker 305, with which the user 302 is in communication.

An embodiment of the runtime algorithm 350 for the system 300 is described as follows, and is also depicted in the simplified flow chart of FIG. 3A1. In a first step 332, the user performs a business action 220 in the source system.

In a second step 334, the source system generates rule relevant event 221. An example of such a rule relevant event is an action relevant for gamification rules.

In a third step 336, the message broker dispatches the event 321 to the manager component of the rule engine, in an asynchronous manner. In a fourth step 338, the event is inserted into the working memory component.

In a fifth step 340, as a consequence of the rule, a request 322 is sent from the manager to the reasoner to fire the appropriate rules based upon events and states from the BEP.

In a sixth step 342, if at least one rule fires, the reasoner issues a call 323 to the proxy which implements an interface of the BEP. In one possible example this may increase of experience points of the user.

The proxy may actually hold two implementations for the BEP. A first implementation delegates the calls to the remote BEP.

A second implementation is used for updating the WM locally. Therefore, this implementation defines the semantic defined by the operations in the BEP, in order to ensure functional correctness In a seventh step 344, the proxy issues an update operation 324 of data in the WM (directly) and the BEP (via the broker) concurrently. This ensures that the WM works with the latest state.

In an optional eighth step 346, each modification in the WM initializes another evaluation cycle 325 in the reasoner. Arbitrary long cycles can be created which are terminated once there is no additional update to the WM.

Figure 3B:
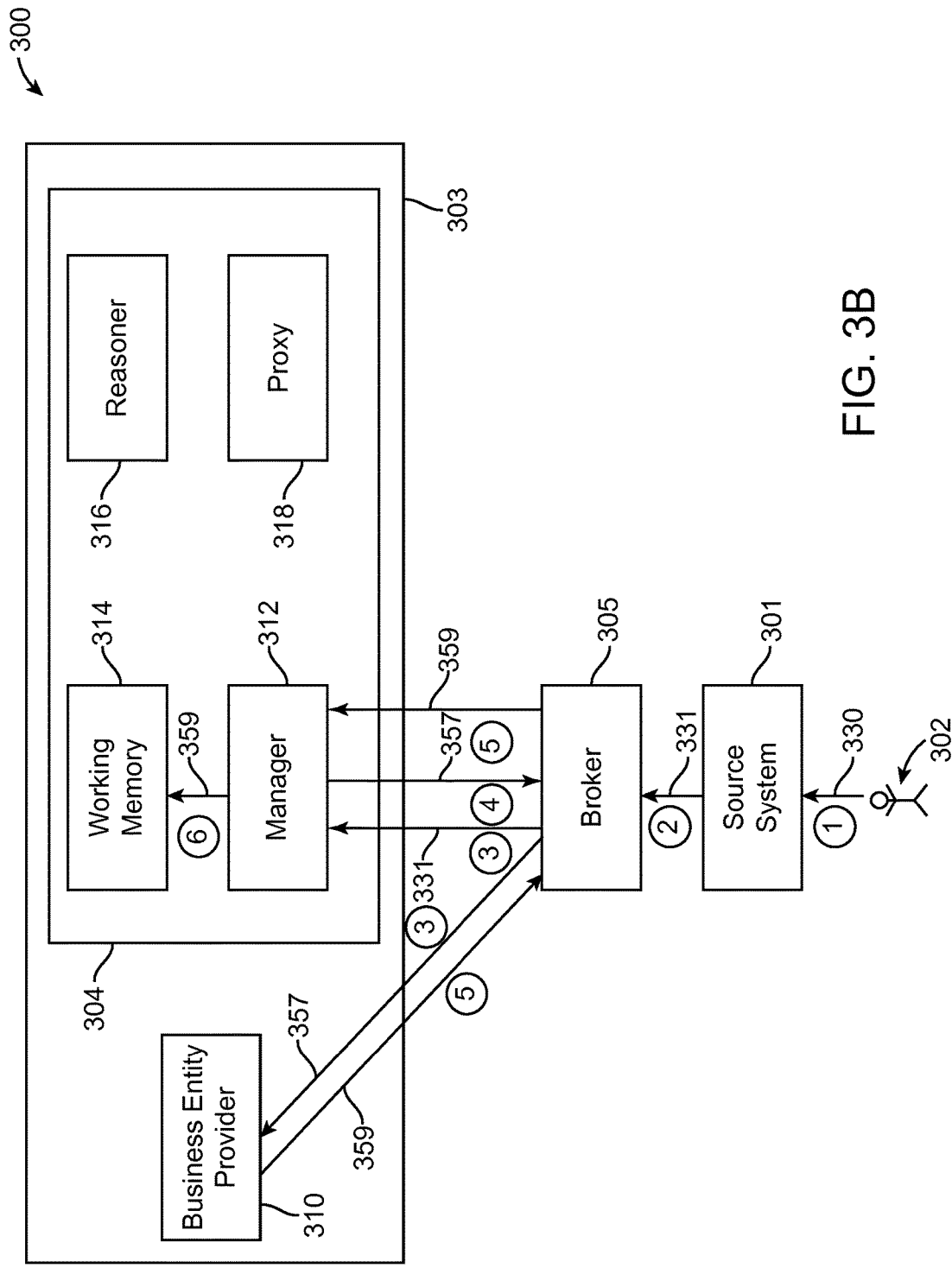
FIG. 3B shows an embodiment of a complex event processing system during initialization.

Prior to the runtime operation described above, the complex event processing system is initialized. FIG. 3B shows complex event processing system 300 during initialization.

An initialization runtime algorithm for the system 300 is shown in FIG. 3B. The steps of this initialization algorithm are also depicted in the simplified flow chart of FIG. 3B1.

In a first step 352, the user 302 performs a relevant action 330 in the source system 301. In a second step 354, the source system generates a respective event 331. In a third step 356, the message broker dispatches the event to the manager component of the rule engine.

As the user has not previously been inserted into the working memory, in a fourth step 358 the manager component sends a request event 357 over the message broker to the BEP (or BEPs where multiple BEPs are present).

In a fifth step 360, the BEP answers this request with player data or other data 359. In a sixth step 362 the player data is inserted into the working memory.

The embodiment of the complex event processing system shown and described in connection with FIGS. 3A-B1 may offer certain benefits. For example the complex event processing system allows querying of a rapidly operating memory (the fast working memory), which is rapidly synchronized during event execution. Moreover, unnecessary synchronization calls are avoided.

Additionally, the source system is updated lazily. This ensures desired performance, as rollback in the rule engine is avoided. Thus error handling may take place at the message broker, for example, if the target BEP is down or the target BEP is in an erroneous state rejecting the update events.

The architecture of the system of FIGS. 3A-B1 allows conflicts to be avoided. Events can be quickly processed, allowing for the rapid feedback typically called for by context aware CEP approaches (such as gamification).

The approach described above in connection with FIGS. 3A-B1 might be sufficient for the synchronization of instance and metadata from the BEP to the WM when the behavior of objects in the BEP is unchanged. A different procedure may be called for, however, when the behavior of objects in the BEP changes. Examples of such changes in object behavior in a gamification context, include but are not limited to the manner of calculation of overall points and scores.

Embodiments of complex processing systems may accommodate ad-hoc changes in the BEP as follows. A business user may implement changes in the BEP directly. Examples of information that can be changed in the BEP, may include but are not limited to: instance data (e.g., the points of a particular set of users), metadata (e.g., new point metrics, new badges, and/or new missions can be introduced), and behavior (e.g., state calculation rules for the players).

Such changes to the BEP can be implemented, for example, via an administration user interface. Hence a change is propagated back into the system using the proxy and to synchronize both high-level and low-level updates.

In order to resolve any possible conflicts arising between events arriving from the source system and changes in the BEP, the proxy may employ user standard procedures since this scenario can be considered as a multi-master replication problem in general. Standard algorithms may apply in this context. One example of such a standard algorithm is Thomas' write rule.

FIGS. 3C1a and 3C2a show operation of the complex event processing system under circumstances where the BEP has been changed by an authorized entity such as a system administrator. The flow of information through the system is shown and described the corresponding FIGS. 3C1b and 3C2b.

In particular, FIGS. 3C1a shows a pessimistic lock procedure. Here, the BEP sends a lock request to the manager directly, and subsequently makes the updates via the manager. Once done, the BEP frees the lock at the manager explicitly. Meanwhile, the manager buffers concurrent events received from the broker or the other source systems.

These buffered events are then populated by the manager into the WM, once the synchronization from the BEP over the proxy into the CEP has been completed.

FIG. 3C1b is a simplified flow diagram of a pessimistic lock procedure. In step 364 the BEP requests a lock. In step 366 the BEP sends 1-to-many updates. If done, the BEP requests the manager to unlock again.

In step 368, the message broker dispatches to the correct gamification platform. In step 370, calls "Update Interface" are implemented by the proxy.

In step 372, the proxy inserts additional data into the working memory. In step 374 this causes reasoning to occur.

In step 376, this reasoning in turn causes updates to be communicated to the proxy. These updates are synchronized back to the BEP In this pessimistic lock scenario, while the manager is locked, events received from the source system are queued in the manager. The events are inserted into the WM after the unlock request from the BEP.

FIGS. 3C2a-b show an optimistic lock procedure. Here, the BEP sends events over the manager. Concurrent to this, other source systems populate events over the manager into the WM as well. The manager implements, for example, Thomas' write rule in order to detect wrong orders of events. In this case, the manager rolls back all data which have been executed in the wrong order, and replays them after a roll back.

FIG. 3C2b is a simplified flow diagram of an optimistic lock scenario. In step 380, the BEP send events to the message broker. Concurrently, in step 382 the source system(s) send events to the message broker.

In step 384 the message broker dispatches to the correct gamification platform.

In step 386, if the manager detects a wrong order between the events received by the BEP and the source systems, it rolls back subsequent actions over the proxy.

In step 388, the proxy may delete events from the working memory. The proxy may revert rules' consequences, based on logs taken by the proxy.

The process flows shown and described in connection with FIG. 3A1, FIG. 3B1, and FIG. 3C1, represents particular embodiments. Other possible embodiments may comprise additional steps, perform fewer than all of the steps shown, and/or perform the steps in a different order than specifically shown.

Complex event processing systems according to various embodiments may offer certain benefits. For example, some embodiments may fulfill performance and real-time requirements due to a replicated environment. Issues with synchronization have been addressed as discussed above.

In addition, the implementation of complex event handling systems may facilitate the implementation of gamification for various types of systems, including but not limited ERP or CRM systems. Other examples of systems include but are not limited to logistical supply systems and production planning systems, to name just a few.

Such gamification of existing systems can serve to increase the intrinsic motivation of users, e.g., for using an enterprise system, maintaining business data. More generally, gamification can help users become more motivated and involved in the surrounding business processes supported by the actual business system.

Complex event processing according to various embodiments allows loosely-coupled integration of gamification into existing enterprise systems, in order to quickly realize a gamification concept. Presented herein are embodiments of complex event processing platforms exhibiting sufficient agility to change with evolution in the motivational concept.

While the above description has focused upon context aware complex event processing in the context of gamification, this is not required. Alternative embodiments could be useful in other types of domains, for example those calling for high consistency in near-real time.

Figure 4:
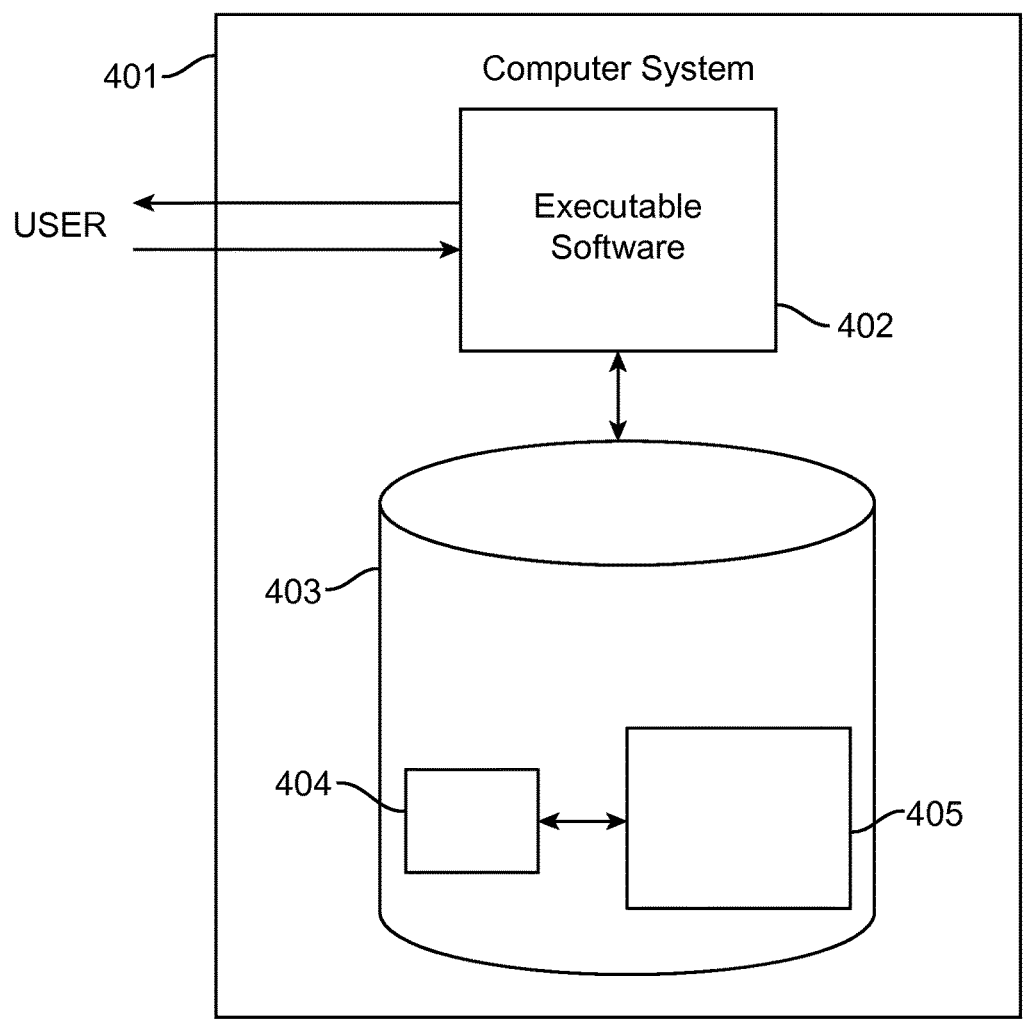
FIG. 4 illustrates hardware of a special purpose computing machine configured to perform complex event processing according to an embodiment.

FIG. 4 illustrates hardware of a special purpose computing machine configured to perform complex event processing according to an embodiment. In particular, computer system 400 comprises a processor 402 that is in electronic communication with a non-transitory computer-readable storage medium 403. This computer-readable storage medium has stored thereon code 405 corresponding to a rule engine. Code 404 corresponds to a source system. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
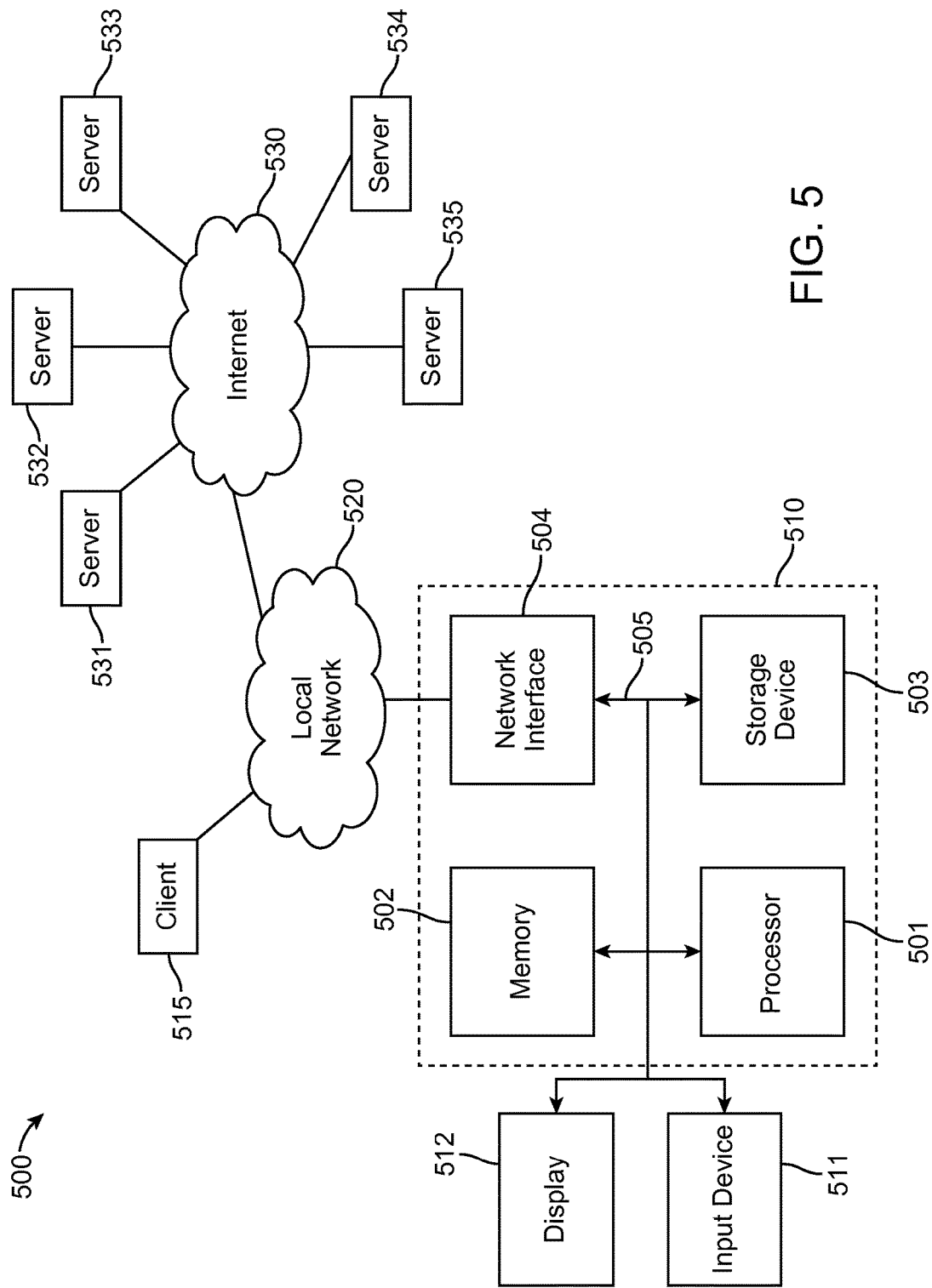
FIG. 5 illustrates an example of a computer system.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 604 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   a rule engine locally storing a first event dispatched from a first remote source system via a message broker in an asynchronous manner;
   the rule engine triggering a first rule relevant to the first event, wherein the first rule involves awarding points in a context-aware gamification platform based upon the first event;
   a proxy component of the rule engine issuing an update operation via the message broker to a first remote provider storing first context information relevant to the first event, the first remote provider and rule engine together comprising the context-aware gamification platform, and the first context information comprising an awarded point total; and
   concurrent with issuing the update operation via the message broker, the proxy component of the rule engine updating the first event stored locally with the first context information.

2. A computer-implemented method as in claim 1 further comprising:
   the rule engine locally storing a second event dispatched from a second source system via the message broker;
   the rule engine triggering a second rule relevant to the second event; and
   the rule engine issuing a second update operation via the message broker to a second provider storing second context information relevant to the second event.

3. A method as in claim 1 wherein the first remote source system comprises a business system, and the first remote provider comprises a business entity provider.

4. A method as in claim 1 wherein during an initialization of the rule engine preceding the first event, the method further comprises:
   the rule engine sending a request event to the first remote provider via the message broker;
   the rule engine receiving data sent by the first remote provider in response to the request event; and
   the rule engine locally storing the data.

5. A method as in claim 1 further comprising the rule engine resolving a conflict arising between the first event and a changed content of the first remote provider.

6. A non-transitory computer readable storage medium embodying a computer program for performing a method, said method comprising:
- a rule engine locally storing a first event dispatched from a first remote source system via a message broker in an asynchronous manner;
- the rule engine triggering a first rule relevant to the first event, wherein the first rule involves awarding points in a context-aware gamification platform based upon the first event;
- a proxy component of the rule engine issuing an update operation via the message broker to a first remote provider storing first context information relevant to the first event, the first remote provider and rule engine together comprising the context-aware gamification platform, and the first context information comprising an awarded point total; and
- concurrent with issuing the update operation via the message broker, the proxy component of the rule engine updating the first event stored locally with the first context information.

7. A non-transitory computer readable storage medium as in claim 6 wherein the method further comprises:
- the rule engine locally storing a second event dispatched from a second remote source system via the message broker;
- the rule engine triggering a second rule relevant to the second event; and
- the rule engine issuing a second update operation via the message broker to a second remote provider storing second context information relevant to the second event.

8. A non-transitory computer readable storage medium as in claim 6 wherein the first remote source system comprises a business system, and the first remote provider comprises a business entity provider.

9. A non-transitory computer readable storage medium as in claim 6 wherein during an initialization of the rule engine preceding the first event, the method further comprises:
- the rule engine sending a request event to the first remote provider via the message broker;
- the rule engine receiving data sent by the first remote provider in response to the request event; and
- the rule engine locally storing the data.

10. A non-transitory computer readable storage medium as in claim 6 wherein the method further comprises the rule engine resolving a conflict arising between the first event and a changed content of the first provider.

11. A computer system comprising:
- one or more processors;
- a first rule engine;
- a software program, executable on said computer system such that:
- the first rule engine locally stores a first event dispatched from a first remote source system via a message broker in an asynchronous manner;
- the rule engine triggers a first rule relevant to the first event, wherein the first rule involves awarding points in a context-aware gamification platform based upon the first event;
- a proxy component of the rule engine issues an update operation via the message broker to a first remote provider storing first context information relevant to the first event, the first remote provider and rule engine together comprising the context-aware gamification platform, and the first context information comprising an awarded point total; and
- concurrent with issuing the update operation via the message broker, the first event stored locally is updated with the first context information by the proxy component.

12. A computer system as in claim 11 wherein the software program is further configured to operate such that:
- the rule engine locally stores a second event dispatched from a second remote source system via the message broker;
- the rule engine triggers a second rule appropriate to the second event; and
- the rule engine issues a second update operation to a second remote provider storing second context information relevant to the second event.

13. A computer system as in claim 11 wherein the first remote source system comprises a business system, and the first remote provider comprises a business entity provider.

14. A computer system as in claim 11 wherein during an initialization of the rule engine preceding the first event, the software program is further configured to operate such that:
- the rule engine sends a request event to the first remote provider via the message broker;
- the rule engine receives data sent by the first remote provider in response to the request event; and
- the rule engine locally stores the data.

* * * * *